Nov. 23, 1965  G. A. GERTSCH  3,219,914
CAPACITIVE POTENTIAL TRANSFORMER
Filed Oct. 22, 1962

INVENTOR.
Georges Albert Gertsch
BY
Pierce, Scheffler & Parker
Attorneys

# United States Patent Office 3,219,914
Patented Nov. 23, 1965

3,219,914
CAPACITIVE POTENTIAL TRANSFORMER
Georges Albert Gertsch, Zurich, Switzerland, assignor to Micafil A.-G., Zurich, Switzerland, a joint-stock company
Filed Oct. 22, 1962, Ser. No. 232,229
Claims priority, application Austria, Oct. 31, 1961, A 8,225/61
3 Claims. (Cl. 323—61)

The present invention relates to an improved construction for potential transformers of the capacitive type and more particularly to an improved arrangement for the type which includes an inductive medium-voltage circuit, the latter being comprised of a transformer and a spark gap.

In accordance with the invention, the improved capacitive potential transformer comprises a capacitive potential divider which includes a plurality of capacitor elements connected in series between a high voltage line and a high-frequency lead-in terminal, there being a grounding coil connected in series between this lead-in terminal and ground, and an inductive medium potential circuit including a transformer, the primary winding of which is connected between a tap point on the potential divider and ground and a spark gap connected between that tap point and the high frequency lead-in terminal.

Figure 1:
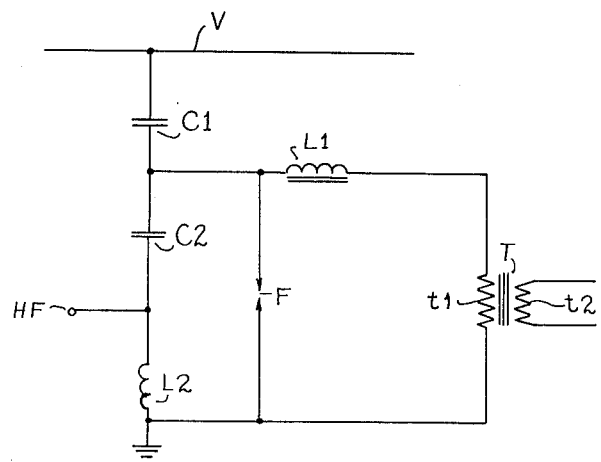
Figure 2:
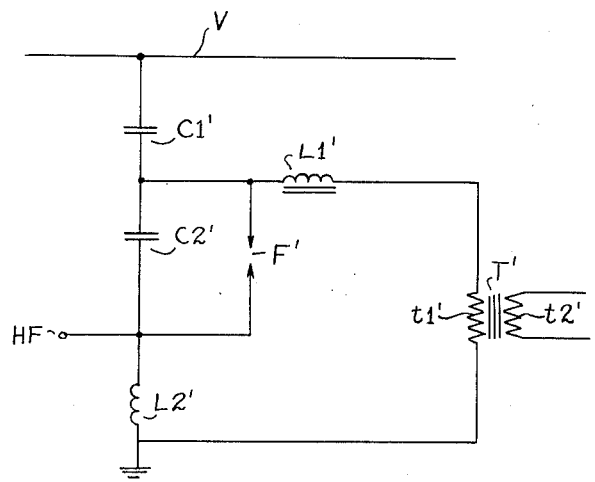

In the accompanying drawings:

FIG. 1 is a circuit diagram of a known type of capacitive potential transformer arrangement; and FIG. 2 is a similar circuit diagram showing an embodiment of a capacitive potential transformer arrangement in accordance with the present invention.

A known type of capacitive potential transformer arrangement, as illustrated in FIG. 1, is seen to be comprised of a capacitive potential divider composed of capacitors C1 and C2 connected in series between a high line V and ground. When this capacitive potential divider is used as a coupling capacitor for transmission of a high frequency current over high voltage lines, a grounding coil L2 is interposed in the connections between capacitor C2 and ground, and the high frequency input is applied between ground and an input terminal HF located intermediate capacitor C2 and coil L2.

The primary winding $t1$ of transformer T, and with usually a choke coil L1 connected in series therewith, constitutes an inductive medium voltage circuit, one end of primary winding $t1$ being connected directly to ground and the other end of this winding being connected through choke coil L1 to a point on the potential divider intermediate capacitors C1 and C2. The secondary of transformer T is indicated at $t2$.

A spark gap F is arranged electrically in parallel with the series circuit arrangement of transformer primary $t1$ and choke coil L1. This spark gap protects the inductive medium-voltage circuit against inadmissibly high over-voltages and further protects the whole capacitive potential transformer against sawtooth oscillations of network frequency due to ferromagnetic resonance.

In the use of the potential divider as a coupling condenser for transmission of (HF) high frequency, the transformer primary winding $t1$ usually cannot be connected to ground through coil L2 because the thus resulting stray capacity of the HF-connection toward the ground would be too great, which circumstance would lead to inadmissibly great HF-losses; therefore it is connected to ground directly. The spark gap arranged in parallel to the inductive medium voltage circuit is consequently directly grounded as well.

The HF-connection is short-circuited during the arcing time of the spark gap, because the HF- current then flows directly over the condenser C2 and the responding spark gap to ground. This taking out of operation of the HF-connection, caused for a short time by the arcing over of the spark gap is especially dangerous in the use of such installations for the network protection, since the arc-over response of the spark gap for the most part happens at the very moment that a trouble occurs in the network. For example, should a short-circuit to ground occur on one phase of the network, the spark gaps related to instrument transformers on those sound phases of the network not affected by the short-circuit may arc-over and thus interrupt transmission of the HF at the very instant when it is needed.

The remedy, known for such conditions, consists in that a resistance or a HF-choke-coil is connected in series with the spark gap. This solution however has the disadvantage that the resistance or the choke has to be proportioned for the high potential across the spark gap, which circumstance leads to correspondingly high manufacturing costs for this resistance or HF-choke-coil.

Through the present invention it is proposed to no longer put the spark gap in parallel to the series arrangement of the grounding coil and one part of the capacitive potential divider, but to connect it in parallel to only one part of the capacitive potential divider. Thus the adding of a resistance or a HF-choke-coil in series to the spark gap can be spared. Any arc-over response of the spark gap then leads only to a small change of the resulting capacitance value of the capacitive potential divider, which causes a slight additional damping of the HF-connection. In this manner the quality of the HF-connection is practically not influenced by the acting of the spark gap, and the HF-signals, which are necessary for a correct operation of the network protection are correctly transmitted by the HF-installation during any arc-over response of the spark gap as well.

One example of an arrangement in accordance with the present invention is illustrated in FIG. 2. In this view, the various circuit components have been designated with the same reference characters as those in FIG. 1 but with primes added to the characters in FIG. 2 for purposes of distinction. Thus, in FIG. 2, the capacitive potential divider is composed of capacitors C1' and C2' connected in series along with a series connection of coil L2' to ground. Choke coil L1' and the primary $t1'$ of transformer T' are connected in series between ground and connection point on the potential divider between capacitors C1' and C2'. The spark gap F' is, however, connected in parallel with capacitor C2' only, rather than in parallel to a series arrangement of capacitor C2 and L2, as in the prior art arrangement of FIG. 1.

I claim:

1. In a capacitive potential transformer arrangement, which can be simultaneously used as a coupling condenser for the HF-connection over high potential lines and comprising a capacitive potential divider, a series-connected grounding coil, an inductive medium-potential circuit comprising a transformer primary winding connected between a tap point on said capacitive potential divider and ground and a spark gap, one side of said spark gap being connected to said tap point and the other side thereof being connected to said potential divider at a point intermediate said grounding coil and the adjacent capacitor element of said potential divider thereby to place said spark in parallel with said capacitor element, and said intermediate point on said potential divider serving as an input terminal for said HF-connection.

2. In a capacitive potential transformer arrangement, the combination comprising a potential divider which includes a plurality of capacitor elements connected in series between a high potential line and a high-frequency input terminal, a grounding coil connected in series between said input terminal and ground, an inductive medium potential circuit including a transformer having its primary winding connected between a tap point on said potential divider and ground, and a spark gap connected between said tap on said potential divider and said input terminal.

3. A capacitive potential transformer arrangement as defined in claim 2 and which further includes a choke coil connected in series with the primary winding of said transformer.

References Cited by the Examiner
UNITED STATES PATENTS 2,186,486  1/1940  Higgins _____ 323—79
2,454,714  11/1948  Osterman _____ 313—325

MILTON O. HIRSHFIELD, Primary Examiner.

LLOYD McCOLLUM, Examiner.